(12) United States Patent
Angal et al.

(10) Patent No.: US 7,358,997 B2
(45) Date of Patent: Apr. 15, 2008

(54) MULTIPLE RESOLUTION OPTICAL IMAGER USING SINGLE SIZE IMAGE ELEMENTS

(75) Inventors: Aditya J. Angal, Lexington, KY (US); Mahesan Chelvayohan, Lexington, KY (US); Patrick L. Kroger, Versailles, KY (US)

(73) Assignee: Lexmark International, Inc., Lexington, KY (US)

( * ) Notice: Subject to any disclaimer, the term of this patent is extended or adjusted under 35 U.S.C. 154(b) by 623 days.

(21) Appl. No.: 11/027,639

(22) Filed: Dec. 30, 2004

(65) Prior Publication Data

US 2006/0146154 A1 Jul. 6, 2006

(51) Int. Cl.
*H04N 5/335* (2006.01)
*H04N 1/04* (2006.01)

(52) U.S. Cl. .............. 348/323; 348/324; 358/483
(58) Field of Classification Search ......... 348/323, 348/324; 358/474, 482, 483
See application file for complete search history.

(56) References Cited

U.S. PATENT DOCUMENTS

| | | |
|---|---|---|
| 5,327,258 A | 7/1994 | Ueda |
| 5,687,003 A | 11/1997 | Nagano |
| 5,754,710 A | 5/1998 | Sekine et al. |
| 5,949,483 A | 9/1999 | Fossum et al. |
| 6,002,810 A | 12/1999 | Wakisawa et al. |
| 6,151,425 A | 11/2000 | Wakisawa et al. |
| 6,169,576 B1 | 1/2001 | Monoi |
| RE37,378 E | 9/2001 | Nagano |
| 6,389,180 B1 | 5/2002 | Wakisawa et al. |
| 6,587,602 B2 * | 7/2003 | Wakisawa et al. .......... 382/298 |
| 6,639,202 B2 * | 10/2003 | Chen ................... 250/208.1 |
| 6,683,706 B1 | 1/2004 | Keithley |
| 6,687,026 B1 | 2/2004 | Steinebach |
| 6,693,670 B1 | 2/2004 | Stark |
| 6,744,543 B1 | 6/2004 | Keithley |
| 6,791,726 B2 | 9/2004 | Spears |
| 2002/0051128 A1 | 5/2002 | Spears et al. |
| 2002/0075530 A1 | 6/2002 | Spears |
| 2002/0093694 A1 | 7/2002 | Spears |
| 2002/0093697 A1 | 7/2002 | Spears et al. |
| 2002/0181033 A1 | 12/2002 | Tandon et al. |
| 2002/0186312 A1 | 12/2002 | Stark |
| 2004/0012829 A1 * | 1/2004 | Takahashi ............... 358/474 |
| 2004/0032628 A1 | 2/2004 | Sato et al. |
| 2004/0109075 A1 | 6/2004 | Tsunai |
| 2004/0169752 A1 | 9/2004 | Stark |

* cited by examiner

*Primary Examiner*—Ngoc-Yen Vu
*Assistant Examiner*—James A Meyers
(74) *Attorney, Agent, or Firm*—William F. Esser

(57) ABSTRACT

An image sensor has two or three rows of imaging elements, all the imaging elements being of the same size. This provides the rows with a native resolution. The image sensor is also provided with three shift registers. First and second shift register elements receive information from respective corresponding imaging element in a first and second row of imagining elements while shift register elements of the third shift register receive information from four imaging elements. The four imaging elements form a super-pixel, allowing the sensor to output information in a low resolution mode, as well a native and a high resolution mode.

23 Claims, 4 Drawing Sheets

MULTIPLE RESOLUTION OPTICAL IMAGER USING SINGLE SIZE IMAGE ELEMENTS

CROSS REFERENCES TO RELATED APPLICATIONS

None.

STATEMENT REGARDING FEDERALLY SPONSORED RESEARCH OR DEVELOPMENT

None.

REFERENCE TO SEQUENTIAL LISTING, ETC.

None.

BACKGROUND

1. Field of the Invention

The present invention is directed to image sensors, such as CIDs, CCDs, and the like. More particularly, it is directed to an image sensor capable of functioning in a plurality of resolution modes.

2. Description of the Related Art

Image scanners convert a visible image on a document or photograph, or an image in a transparent medium, into an electronic form suitable for copying, storing or processing by a computer. An image scanner can be a separate device or an image scanner may be a part of a copier, part of a facsimile machine, or part of a multipurpose or all-in-one device having printing, scanning, copying and or faxing functionality. Reflective image scanners typically have a controlled source of light, and light is reflected off the surface of a document, through an optics system, and onto an array of photosensitive devices. The photosensitive devices convert received light intensity into an electronic signal. Transparency image scanners pass light through a transparent image, for example a photographic positive slide, through an optics system, and then onto an array of photosensitive devices. Common photosensor technologies include Charge Coupled Devices (CCD), Charge Injection Devices (CID), Complementary-Metal-Oxide (CMOS) devices, and solar cells. Typically, for a CID or a CMOS array, each photosensitive element is addressable. In contrast, CCD line arrays commonly serially transfer all the charges, bucket-brigade style, from each line array of photosensitive elements to a small number of sense nodes for conversion of charge into a measurable voltage.

In general, there is an ongoing demand for increased resolution and speed, improved color quality and image quality, and reduced cost, demands that often directly conflict and require trade-offs. In general, image scanners use an optical lens system to focus an image onto an array of photosensors. Photosensor arrays typically have thousands of individual photosensitive elements. Each photosensitive element, in conjunction with the scanner optics system, measures light intensity from an effective area on the document defining a picture element (pixel) on the image being scanned. Optical sampling rate is often expressed as pixels per inch or "ppi" (or pixels per millimeter) as measured on the document (or object, or transparency) being scanned. Optical sampling rate as measured on the document being scanned is also called the input sampling rate. Photosensor assemblies for linear (as opposed to two-dimension) image scanners commonly have three or four line arrays of sensors, with each line array receiving a different band of wavelengths of light, for example, red, green and blue. Each line array may be filtered, or white light may be separated into different bands of wavelengths by a beam splitter. Typically, the pitch (spacing of individual photosensor elements) is the same for each line array, and typically the pitch is set to provide a specified native input sampling rate. The native input sampling rate is determined by the optics and the pitch of the individual sensors. A scanner operator can select a sampling rate that is less than the native input sampling rate by simply dropping selected pixels, or by using digital resampling techniques. Alternatively, a scanner operator can select a sampling rate that is greater than the native input sampling rate, where intermediate values are computed by interpolation. Typically, all the charges or voltages are read from the photosensor array, and are then digitized, and then subsampling or interpolation is performed on the resulting digital pixel data.

Smaller sensor areas can provide higher input sampling rates, but other measures of image quality, and in particular color quality, as measured by signal-to-noise, may be reduced. If an input sampling rate is selected that is lower than the native input sampling rate, then the signal-to-noise may be improved by averaging samples. Analog signals from adjacent sensor areas can be added, or digital values can be averaged after analog-to-digital conversion. Adding M samples improves the signal-to-noise ratio by the square root of M. Typically, adding analog signals requires the signal levels to be relatively small before adding to avoid saturating a charge element, so that analog averaging is typically used for speed (fewer conversions) rather than for improvement in signal-to-noise ratio. Scanning speed is affected by multiple factors: exposure time, shift time of registers multiplied by number of pixels being shifted, output amplifier speed, and analog-to-digital conversion time.

As imager sensors continue to increase in resolution, the actual imaging elements become smaller. This smaller element has a lower sensitivity to light and requires a larger exposure time to maintain a good signal to noise ratio (SNR), and this impacts image quality.

Current technology exists in which an image sensor contains both high resolution and low resolution imaging elements built on a single piece of silicon substrate. The low resolution imaging elements are much larger than the high resolution imaging elements and therefore have much more sensitivity to light. This allows the imager to operate at higher speeds while still maintaining good image quality. This technology is generally referred to in the industry as a "dual mode sensor". U.S. Patent Publication No. 2002/0093694 discloses a photosensor assembly comprising a first array of photosensor elements, each photosensor element in the first array having a first size; a second array of photosensor elements, each photosensor element in the second array having a second size, wherein the first size and second size are substantially different.

The prior art also includes using multiple imaging elements that are the same size which are then summed together, on a single piece of silicon, to create a larger "superpixel". U.S. Pat. No. 6,687,026 discloses such a design.

U.S. Patent Publication No. 2004/0109075 discloses a number of prior art arrangements calling for two or more rows of imaging elements of the same size, at least one row being staggered relative to another row. As is known to those skilled in the art, by appropriate spatial staggering and appropriate timing for receiving and summing signal charges, one can achieve a pixel resolution greater than that of the native resolution of the imaging elements.

FIG. 1 shows a portion of a prior art image sensor 100 in which two rows of imaging elements are staggered. It is understood that the image sensor 100 preferably is formed on single piece of silicon. It is further understood that FIG. 1 depicts the layout for one color, it being understood that this layout is repeated for each color in a color copier, scanner or all-in-one unit.

The image sensor 100 of FIG. 1 comprises two rows 102, 104, each row having a plurality of linearly-arranged imaging elements. Imaging element row 102 is shown to have individual imaging elements 122A, 122B, 122C, 122D, etc., while imaging element row 104 is shown to have individual imaging elements 124A, 124B, 124C, 124D, etc. Shaded regions between adjacent imaging elements in each row depict a physical spacing between the imaging elements. Most notably, in the prior art image sensor 100, all the imaging elements in the various rows 102, 104 are of equal size. The imaging elements in any one row are configured and dimensioned to provide some native resolution, such as 300 ppi, 600 ppi, or some other resolution. Without loss of generality, one can consider the individual imaging elements in the prior art image sensor 100 to have a native resolution of 600 ppi.

The image sensor 100 also comprises two shift registers 112, 114 whose final outputs are directed to output amplifiers 172, 174, respectively. Each shift register 112, 114 comprises a plurality of linearly-arranged shift register elements, respectively designated 132A, 132B, 132C, 132D, and 134A, 134B, 134C and 134D in the figure. It is understood that there typically are many more than just four such shift register elements; designs incorporating hundreds, if not thousands, of such shift register elements (and imaging elements) is not atypical. As also seen in FIG. 1, the imaging element rows 102, 104 pass their charge outputs to the shift registers 112, 114 via transfer gate circuitry 162, 164, respectively.

Furthermore, as seen in the prior art orientation of FIG. 1, the imaging element rows 102 and 104 and their corresponding shift registers 112, 114 are arranged parallel to one another. Shift registers 112 and 114 are at opposite extremes of the layout. Beginning at shift register 112 and traversing the sensor are, in order, imaging element row 102, imaging element row 104 and shift register 114.

As depicted by arrows 152 the charge from each imaging element of row 102 is provided to a shift register element in row 112, while as depicted by arrows 154 the charge from each imaging element of row 104 is provided to a shift register element in row 114. More particularly, each imaging element 122A, 122B, 122C, 122D in row 102 outputs sensor charge via a one-to-one mapping to a corresponding shift register element 132A, 132B, 132C, 132D, respectively. Similarly, each imaging element 124A, 124B, 124C, 124D in row 104 outputs sensor charge via a one-to-one mapping to a corresponding shift register element 134A, 134B, 134C, 134D, respectively. All the shift register elements in the shift registers 112, 114, respectively, are of the same, first design. In a preferred embodiment, row 104 and its corresponding shift register 114 serve as a native resolution CCD imager 160 having 600 ppi resolution.

A clock 196 provides the prior art image sensor 100 with a clock signal 196A that is presented to both shift registers 112, 114 to regulate the reading of charges and shifting of the charge values. A controller 198 provides control signals to the clock, transfer gates, output amplifiers and other components.

Imaging element rows 102 and 104 are staggered relative to one another. More particularly, row 102 is laterally shifted by one-half pixel width relative to imaging element row 104. This means that the output of their corresponding shift registers can be used for interpolation, thereby providing twice the spatial resolution of either row 102 or 104 by itself. Thus, if imaging element rows individually provide a native resolution of 600 ppi, the staggered high-resolution CCD imager 170 formed by these two rows provides a resolution of 1200 ppi.

SUMMARY OF THE INVENTION

In one aspect, the present invention is directed to a single chip image sensor comprising first and second rows of linearly arranged imaging elements all having a same size, and first, second and third shift registers. Each imaging element of the first row provides information to a corresponding shift register element in the first shift register, and each imaging element of the second row provides information to a corresponding shift register element in the second shift register. The third shift register comprises a plurality of shift register elements, each of said shift register elements in the third shift register receiving information from a total of four imaging elements which together form a super-pixel in the linear image sensor. The first and second rows of linearly arranged imaging elements are staggered relative to one another, and exactly two of said four imaging elements belong to the first row.

In another aspect, the present invention is directed to an improvement in a single-chip linear image sensor. The single-chip linear image sensor includes first and second rows of linearly arranged imaging elements all having a same size, the first row of linearly arranged imaging elements being staggered relative to the second row, the first and second rows of linearly arranged imaging elements having associated therewith respective first and second shift registers. The improvement comprises a third shift register comprising a plurality of shift register elements, each of said shift register elements receiving information from a total of four imaging elements, two of said four imaging elements being in the first row and two other of said four imaging elements being in the second row, the four imaging elements together forming a parallelogrammatic super-pixel in the linear image sensor, whereby the linear image sensor is capable of providing three different resolutions.

In still another aspect, the present invention is directed to a single-chip linear image sensor comprising first, second and third rows of same-sized imaging elements having a first resolution, the first and second rows having their imaging elements staggered relative to one another, and the first and third rows having their imaging elements aligned with one another. The image sensor also has first, second and third shift registers, each comprising a plurality of shift register elements. The first and second rows of same-sized imaging elements and the first and second shift registers together provide a second resolution higher than the first resolution, and the first and third rows of same-sized imaging elements and the third shift register together provide a third resolution lower than the first resolution, wherein at least two imaging elements from each of the first and third rows of same-sized imaging elements output their charges to a single shift register element belonging to the third shift register.

Furthermore, the first, second and third rows and the first, second and third shift registers can all be parallel to one another. In addition, the various rows of imaging elements and the shift registers can be arranged such that the first row is adjacent the first shift register, the second row is adjacent the first row, the second shift register is adjacent the second row, the third row is adjacent the second shift register and the third shift register is adjacent the third row. Moreover, the shift register elements of the first and second shift registers accept information from exactly one imaging element while the shift register elements of the third shift register receive information from exactly four imaging elements.

BRIEF DESCRIPTION OF THE DRAWINGS

The invention is now described with reference to the attached drawings in which.

DETAILED DESCRIPTION

The contents of aforementioned U.S. Pat. No. 6,687,026, U.S. Patent Publication No. 2002/0093694, and U.S. Patent Publication No. 2004/0109075 are incorporated by reference to the extent necessary to understand the present invention.

Figure 1:
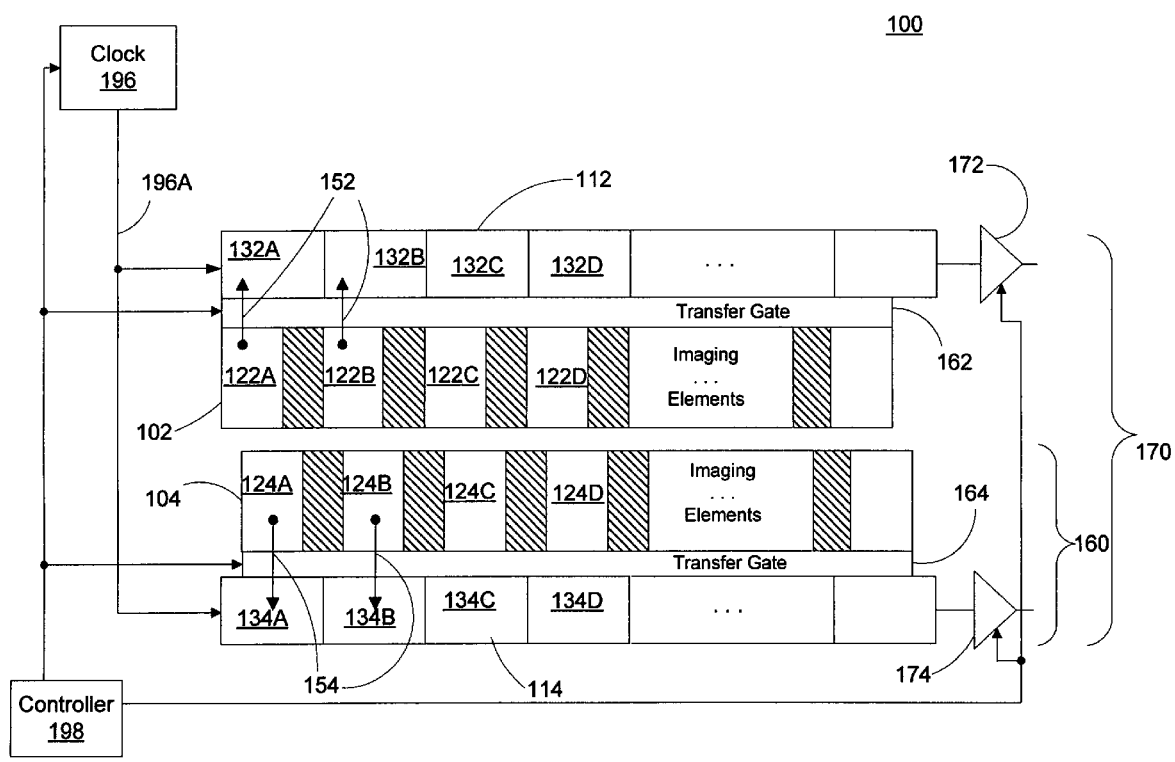
FIG. 1 shows a layout of a prior art image sensor having two staggered rows of imaging elements.
Figure 2:
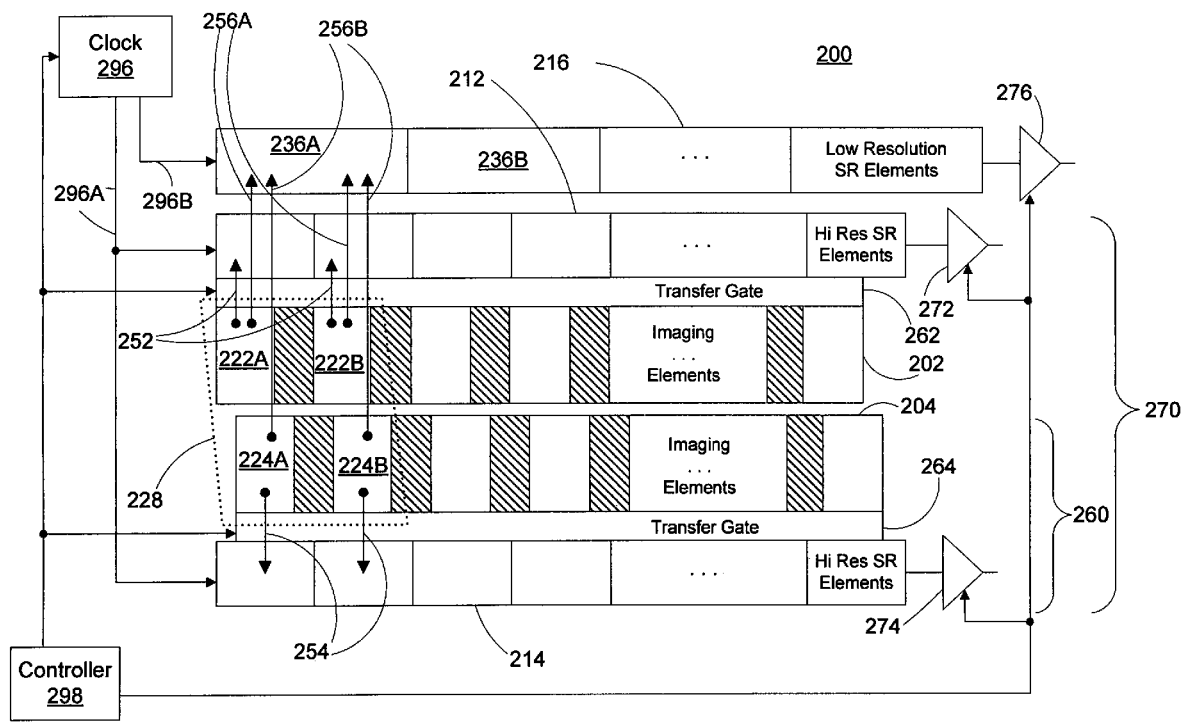
FIG. 2 shows a layout of an image sensor in accordance with a first embodiment of the present invention.

FIG. 2 shows a portion of an image sensor 200 in accordance with one embodiment of the present invention. FIG. 2 includes all the components of the prior art image sensor of FIG. 1, the common parts being indicated in FIG. 2 by reference numerals having a value 100 greater than their corresponding values in FIG. 1. Thus, image sensor 200 comprises first and second rows 202, 204 of imaging elements, all the imaging element having the same size. The first and second rows 202, 204 connect to respective first and second shift registers 212, 214 via respective first and second transfer gate circuitry 262, 264. The outputs of first and second shift registers 212, 214 feed into respective first and second output amplifiers 272, 274. As depicted by arrows 252, the output of each imaging element in row 202 is mapped onto a corresponding shift register element in shift register 212. Similarly, as depicted by arrows 254, the output of each imaging element in row 204 is mapped onto a corresponding shift register element in shift register 214. A clock 296 provides the image sensor 200 with a first clock signal 296A that is presented to both shift registers 212, 214 to regulate the reading of charges and shifting of the charge values. A controller 298 provides control signals to the clock, transfer gates, output amplifiers and other components. Imaging element rows 202 and 204 are staggered relative to one another, with row 202 being laterally shifted by one-half pixel width relative to imaging element row 204. This means that the output of their corresponding shift registers can be used for interpolation, thereby providing twice the spatial resolution of either row 202 or 204 by itself. Thus, if imaging element rows individually provide a native resolution of 600 ppi, the staggered high-resolution CCD imager 270 formed by these two rows provides a resolution of 1200 ppi, while row 204 and its corresponding shift register 214 serve as a native resolution CCD imager 260 having 600 ppi resolution.

Thus far, the description of the image sensor 200 is identical to that of the prior art image sensor 100, described above.

Image sensor 200, however, further comprises a third shift register 216 having a plurality of low resolution shift register elements, designated 236A, 236B, etc. The clock 296 provides a second clock signal 296B to control operation of the third shift register 216, whose output is presented to an output amplifier 276. Four imaging elements 222A, 222B, 224A, 224B, two from each of rows 202 and 204, are connected to a low resolution shift register element 236A via a transfer gate (not shown). Arrows 256A depict charge flow from imaging elements 222A, 222B to third shift register 216 while arrows 256B depict charge flow from imaging elements 224A, 224B to the third shift register 216.

Thus, shift register element 236A receives input from a low resolution, parallelogrammatic "super-pixel" 228, the parallelogram shape being depicted by the dotted line box. The super-pixel 228 itself is formed from the four imaging elements 222A, 222B, 224A, 224B, two imaging elements in one row being staggered by a half-pixel width relative to the two imaging elements in the other row. Thus, as used herein, the term "parallelogrammatic super-pixel" refers to an arrangement of four imaging elements, or pixels, two from each of two adjacent rows that are staggered relative to each other and whose outputs are combined to produce a single signal representative of the light received at all four imaging elements.

As seen in FIG. 2, each of the four imaging elements 222A, 222B, 224A, 224B belonging to the super-pixel are dual ported—their charges flow to two distinct shift registers. In one embodiment, however, each of these four imaging elements is only able to provide charge to one shift register at a time, as directed by controller 198. Thus, at any given time, imaging elements 222A and 222B can provide output to either the individual correspondingly dedicated shift register elements of shift register 212, or to the low resolution shift register element 236A. Similarly, at any given time, imaging elements 224A and 224B can provide output to either the individual correspondingly dedicated shift register elements of shift register 214, or to the low resolution shift register element 236A.

One consequence of the arrangement seen in FIG. 2 is that image sensor 200 is capable of three resolutions, in this case, using only two rows of same-sized imaging elements. The three resolutions include: (1) the native resolution from image element row 204 and shift register 214 and or image element row 202 and shift register 212; (2) the high resolution provided by combining the outputs from the staggered image element rows 202, 204 and their corresponding shift registers 212, 214, respectively; and (3) the low resolution from summing the output charges from four imaging elements, arranged in a parallelogrammatic fashion.

Generally speaking, with the design of FIG. 2, if the native resolution is some number N ppi, then the high resolution is 2N ppi while the low resolution is N/2 ppi. In one embodiment, the native resolution is 600 ppi, and so the high resolution is 1200 ppi while the low resolution is 300 ppi. However, if the four imaging elements 222A, 222B, 224A, 224B can only provide charge to one shift register at a time, then, at any given time, the image sensor 200 can only output either: (1) a 300 ppi resolution image stream via output amplifier 276, or (2) two 600 ppi resolution image streams via output amplifiers 272 and 274, which, since their signal comes from staggered rows 202, 204, can be combined to form a 1200 ppi signal.

Figure 4:
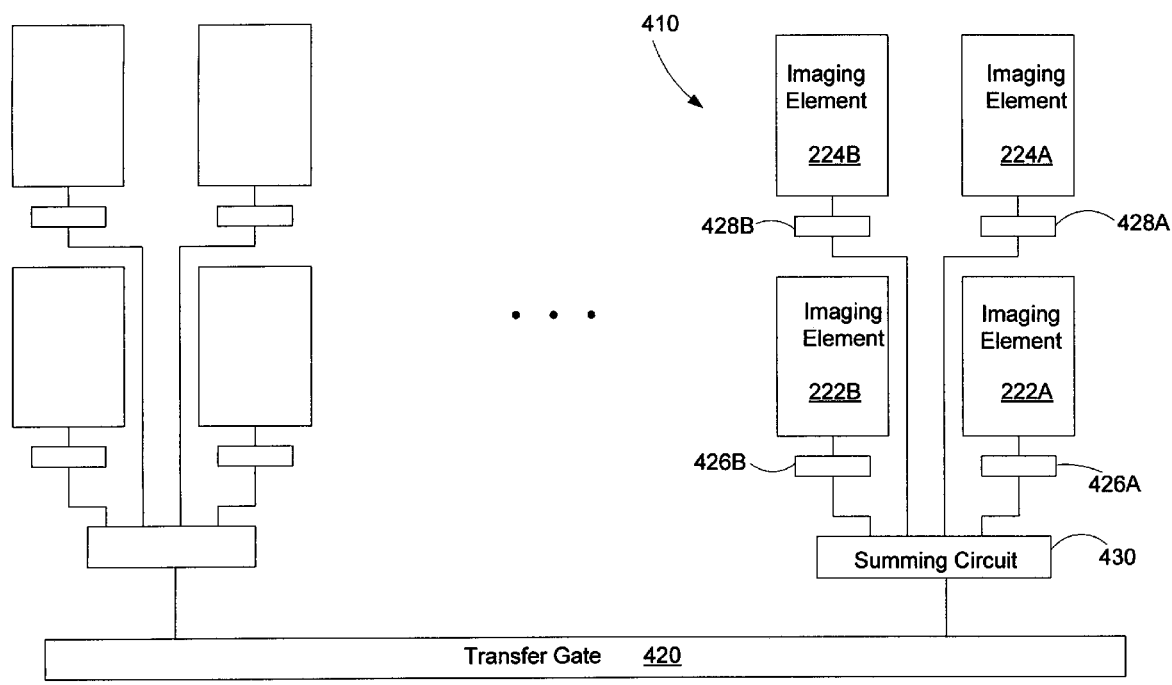
FIG. 4 shows a combing circuit for combining the outputs of four imaging elements

FIG. 4 shows an embodiment of a combining circuit 410 which combines the output from four imaging elements belonging to a super-pixel and presents this output to a transfer gate 420 associated with the third shift register 216.

Thus, the combining circuit produced a single signal representative of the light received at all four imaging elements comprised the super-pixel. In the combining circuit 410, the output of each of four imaging elements 222A, 222B, 224A, 224B passes through a respective photogate 426A, 426B, 428A, 428B, and is input to a summing circuit 430. The output of the summing circuit 430 is then passed on to the transfer gate 420. As represented by the ellipses in FIG. 4, there are several such combining circuits, each associated with a four-plex of imaging elements, all connecting to the transfer gate 420, from which the signals are passed to the respective low resolution shift register elements 236A, 236B, etc. of shift register 216.

Implementation of image sensor 200 in silicon or other substrate is well within the ability of one skilled in the art of image sensor design and fabrication. In one embodiment, the paths represented by arrows 256A and 256B of FIG. 2, and thus, at least a portion of the combining circuit 410, could be buried in layers beneath other components in the chip, such as the first shift register 212 and the first transfer gate 262.

In image sensor 200, the layout of the first and second rows 202, 204 and the first and second shift registers 212, 214 is the same as that seen in FIG. 1. The added, low resolution shift register 216 is formed in silicon on the other side of the first shift register 212, away from the rows of imaging elements. Thus, traversing the image sensor from the top of FIG. 2 to the bottom, one encounters the low resolution shift register 216, a first high resolution shift register 212, the first row 202 of imaging elements, the second row 204 of imaging elements, and then the second high resolution shift register 214. Thus, the third shift register 216 is spaced apart from the first row 202 by at least a width of the first shift register 212. It is understood, however, that one could transpose the placement of the third (low resolution) shift register 216 and the first (high resolution) shift register 212 while preserving the spirit of the present embodiment.

Figure 3:
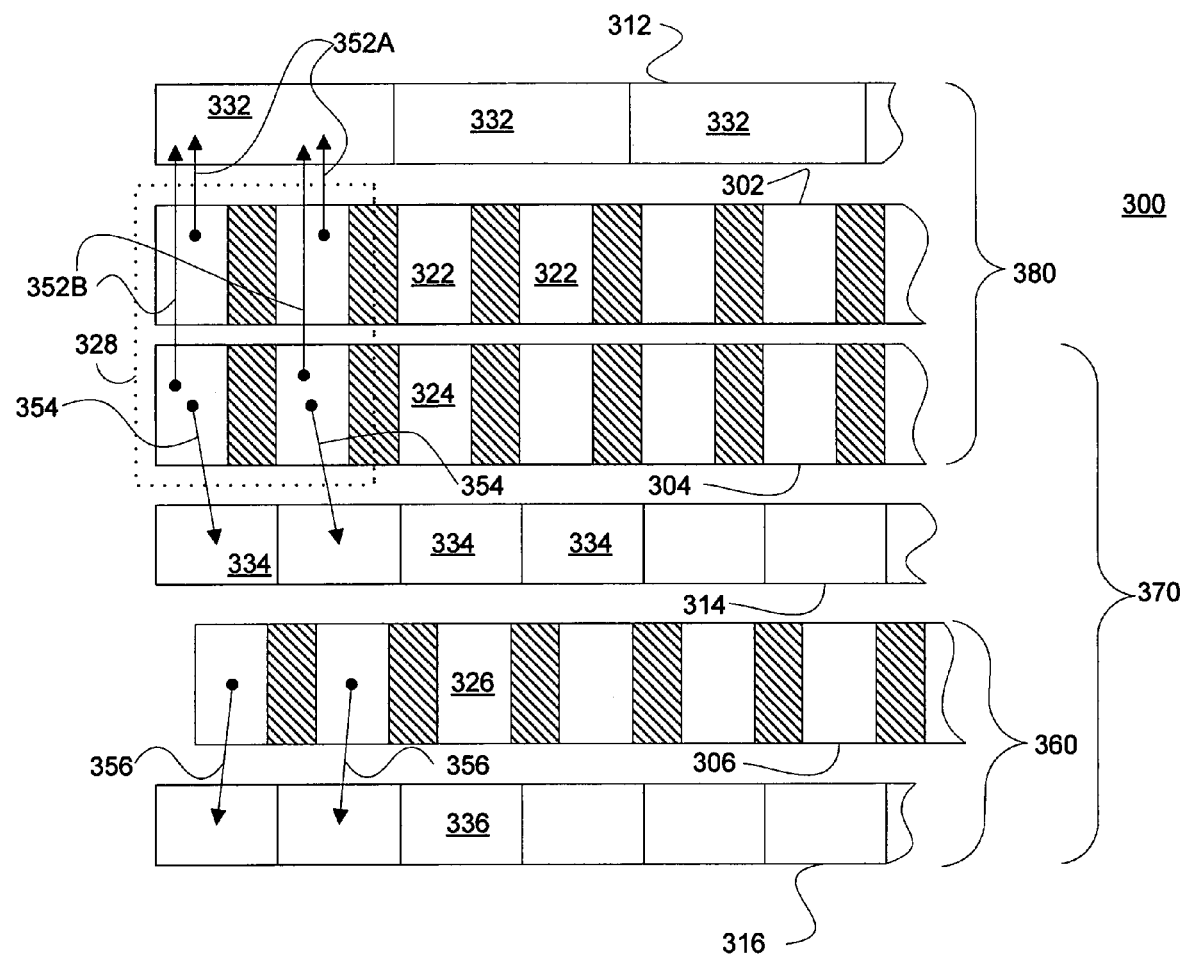
FIG. 3 shows a layout of an image sensor in accordance with a second embodiment of the present invention.

FIG. 3 shows a portion of an image sensor 300 in accordance with another embodiment of present invention. Again, it is understood that the image sensor is formed on single piece of silicon. It is further understood that FIG. 3 depicts the layout for one color, it being understood that this layout is repeated for each color in a color copier, scanner or all-in-one unit.

In FIG. 3, the clock, controller, transfer gates and output amplifiers have been omitted to simplify the present discussion. It is understood, however, that these elements, though not shown, are present in this embodiment.

The image sensor 300 of FIG. 3 comprises three rows 302, 304 and 306, each row having a plurality of linearly-arranged imaging elements. Imaging element rows 302, 304 and 306 are shown to comprise a plurality of imaging elements 322, 324 and 326, respectively. Shaded regions between adjacent imaging elements in a row depict a physical spacing between the imaging elements. It is desirable that all the imaging elements 322, 324 and 326 in the various rows 302, 304 and 306 be of the same size and that the imaging elements in any one row are configured and dimensioned to provide a native resolution of 600 ppi.

The image sensor 300 also comprises three shift registers 312, 314, 316, each shift register comprising plurality of linearly-arranged shift register elements 332, 334 and 336, respectively. As seen in the orientation of FIG. 3, the imaging element rows 302, 304 and 306 and the shift registers 312, 314 and 316 are arranged parallel to one another. Third shift register 312 and second shift register 316 are at opposite extremes of the layout. Beginning at third shift register 312 and traversing the sensor are, in order, third imaging element row 302, first imaging element row 304, first shift register 314, second imaging element row 306 and second shift register 316.

Each imaging element 324 in first row 304 outputs sensor charge to corresponding shift register element 334 in first shift register 314. Similarly, each imaging element 326 in second row 306 outputs sensor charge to corresponding shift register element 336 in second shift register 316. All the shift register elements 334 and 336 in the shift registers 314, 316, respectively, are of the same, first design. Second row 306 and its corresponding shift register 316 can be configured to serve as a native resolution CCD imager 360.

As depicted by arrows 354, the charge from each imaging element 324 of first row 304 is provided to a corresponding shift register element 334, while as depicted by arrows 356 the charge from each imaging element 326 of second row 306 is provided to a corresponding shift register element 336 in second shift register 316. In addition, imaging element rows 304 and 306 are staggered relative to one another. More particularly, second row 306 is laterally shifted by one-half pixel width relative to first imaging element row 304. This means that the output of their corresponding shift registers 314, 316 can be used for interpolation, thereby providing twice the spatial resolution of either row 304 or 306 by itself. Thus, if these two imaging element rows 304, 306 individually provide a native resolution of 600 ppi, the staggered high-resolution CCD imager 170 formed by these rows provides a resolution of 1200 ppi.

Third imaging element row 302 is aligned with (i.e., not staggered relative to) first imaging element row 304. Third shift register 312 comprises shift register elements 332 of a second design that is different from that of shift register elements 334, 336. In particular, third shift register 312 comprises a plurality of low resolution shift register elements 332, each of which are configured to receive charge from a plurality of imaging elements.

Each low resolution shift register element 332 receives charge from four imaging elements. The four elements include two from first imaging element row 304 and two from third imaging element row 302 which is aligned with the first row 304. In effect, then, the four imaging elements, two from the first row 304 and two from the third row 302, serve as a low resolution rectangular "super-pixel" 328, the rectangular shape indicated by the dotted line box. Arrows 352A depict the charge transfer from the elements in third row 302, and arrows 352B depicting the charge transfer from the elements in first row 304.

As discussed with respect to the embodiment of FIG. 2, a combining circuit 410 is used to sum charges from the four imaging elements and feed this signal to the low resolution shift register elements 332. In the embodiment of FIG. 3, the combining circuit is configured to produce a single signal representative of the light received at two imaging elements from each of the first and third rows, and this single signal is ultimately provided to a corresponding one of the plurality of shift register elements 332. Furthermore, the shift register elements of the first and second shift registers 314, 316 receive information from exactly one imaging element, while each of the shift register elements of the third shift register 312 receive information from exactly four imaging elements.

The imaging elements 324 of first row 304 are dual-ported—their charges flow to two distinct shift registers. Each of the imaging elements in the first row 304 is only able to provide charge to one shift register at a time, much like the embodiment discussed above with respect to FIG. 2.

Thus, at any given time, imaging elements in the first row 304 can provide output to either the individually dedicated shift register elements of first shift register 314, or to a low resolution shift register element 332 in third shift register 312.

One consequence of the arrangement seen in FIG. 3 is that image sensor 300 is capable of three resolutions, in this case, using three rows of same-sized imaging elements. The three resolutions include: (1) the native resolution from second image element row 306 and second shift register 316 or the native resolution from the first image element row 304 and first shift register 314; (2) the high resolution provided by combining the outputs from the staggered first image element row 304 and second image element row 306 and their corresponding shift registers 314, 316, respectively; and (3) the low resolution from summing the output charges from four imaging elements, two belonging to the first image element row 304 and two others belonging to the third image element row 302, the four imaging elements forming a rectangular super-pixel.

As is the case in the embodiment of FIG. 2, if the native resolution is some number N ppi, then the high resolution is 2N ppi while the low resolution is N/2 ppi. If the native resolution is 600 ppi, then the high resolution is 1200 ppi while the low resolution is 300 ppi. However, if the imaging elements in the first row 304 can only provide charge to one shift register at a time, then, at any given time, the image sensor 300 can only output either: (1) a 300 ppi resolution image stream from third shift register 312 and a 600 ppi image stream from second shift register 316, or (2) two 600 ppi resolution image streams from first shift register 314 and second shift register 316 which, since their signal comes from staggered rows 202, 204, can be combined to form a 1200 ppi signal.

A comparison of the embodiments of FIG. 2 and FIG. 3 shows that the former has two rows of dual ported imaging elements, while the latter has only one. Furthermore, the embodiment of FIG. 3 has an additional row (the third row 302) of imaging elements, which is only used when using the low resolution mode.

In the foregoing embodiments, the native resolution was described as being 600 ppi. It is understood, however, that the present invention may also apply to a design in which the native resolution is of other sizes. For instance, if the native resolution is 1200 ppi, then low and high resolutions of 600 ppi and 2400 ppi, respectively, can be realized using the same principles.

The present invention has been described with respect to specific embodiments. However, it will be appreciated that modifications and variations of the present invention are covered by the above teachings and within the purview of the appended claims without departing from the spirit and intended scope of the invention.

What is claimed is:

1. A single-chip linear image sensor comprising:
   first and second rows of linearly arranged plurality of imaging elements all having a same size;
   first, second and third shift registers, each having a plurality of shift register elements;
   each imaging element of the first row providing information to a corresponding shift register element in the first shift register;
   each imaging element of the second row providing information to a corresponding shift register element in the second shift register;
   each of said shift register elements in the third shift register receiving information from a total of four imaging elements which together form a super-pixel in the linear image sensor, wherein:
   the first and second rows of linearly arranged imaging elements are staggered relative to one another; and
   exactly two of said four imaging elements belong to the first row.

2. The single-chip linear image sensor according to claim 1, wherein:
   the first and second rows of linearly arranged imaging elements are adjacent one another; and
   exactly two other of said four imaging elements belong to the second row.

3. The single-chip linear image sensor according to claim 1, wherein the super-pixel is a parallelogrammatic super-pixel.

4. The single-chip linear image sensor according to claim 1, wherein the third shift register is spaced apart from the first row by the first shift register.

5. The single-chip linear image sensor according to claim 1, wherein the first and second rows of linearly arranged imaging elements are spaced apart from one another by the first shift register.

6. The single-chip linear image sensor according to claim 1, wherein the plurality of imaging elements are dual ported.

7. The single-chip linear image sensor according to claim 1, further comprising a third row of a plurality of linearly arranged imaging elements, the imaging elements in the third row having a same size as the imaging elements in the first and second rows, and wherein exactly two other of said four imaging elements belong to the third row.

8. The single-chip linear image sensor according to claim 7, wherein the first and third rows are aligned with each other and adjacent to one another.

9. The single-chip linear image sensor according to claim 8, wherein the super-pixel is a rectangular super-pixel.

10. The single-chip linear image sensor according to claim 7 wherein the plurality of linearly arranged imaging elements in the first row are dual ported.

11. In a single-chip linear image sensor comprising first and second rows of a plurality of linearly arranged imaging elements all having a same size, the first row of linearly arranged imaging elements being staggered relative to the second row, the first and second rows of linearly arranged imaging elements having associated therewith respective first and second shift registers, the improvement comprising:
   a third shift register comprising a plurality of shift register elements, each of said shift register elements receiving information from a total of four imaging elements, two of said four imaging elements being in the first row and two other of said four imaging elements being in the second row, the four imaging elements together forming a parallelogrammatic super-pixel in the linear image sensor, whereby the linear image sensor is capable of providing three different resolutions.

12. The single-chip linear image sensor according to claim 11, wherein the sensor is configured to simultaneously output one of: (a) a native resolution and a high resolution image stream, and (b) a low resolution, the high resolution image stream being twice the spatial resolution of the native resolution image stream, and the low resolution image stream being one-half the spatial resolution of the native resolution image stream.

13. The single-chip linear image sensor according to claim 12, wherein the native resolution is N ppi, the high resolution is 2N ppi and the low resolution is ½ N ppi.

14. The single-chip linear image sensor according to claim 13 wherein N is one of 300 dpi, 600 ppi and 1200 ppi.

15. The single-chip linear image sensor according to claim 11, further comprising a combining circuit configured to produce a single signal representative of the light received at said four imaging elements, said single signal being provided to at least one of said plurality of shift register elements in said third shift register.

16. The single-chip linear image sensor according to claim 11, wherein the first shift register is interposed between the first row and the third shift register.

17. A single-chip linear image sensor comprising:
first, second and third rows having a plurality of same-sized imaging elements having a first spatial resolution, the first and second rows having their imaging elements staggered relative to one another, and the first and third rows having their imaging elements aligned with one another; and
first, second and third shift registers, each comprising a plurality of shift register elements;
wherein:
the first and second rows of same-sized imaging elements and the first and second shift registers together provide a second spatial resolution higher than the first spatial resolution; and
the first and third rows of same-sized imaging elements and the third shift register together provide a third spatial resolution lower than the first spatial resolution, wherein at least two imaging elements from each of the first and third rows of same-sized imaging elements output their charges to a single shift register element belonging to the third shift register.

18. The single-chip linear image sensor according to claim 17, wherein the sensor is configured to simultaneously output one of: (a) a native resolution and a high resolution image stream, or (b) a low resolution and a native resolution image stream, the high resolution image stream being twice the spatial resolution of the native resolution image stream, and the low resolution image stream being one-half the spatial resolution of the native resolution image stream.

19. The single-chip linear image sensor according to claim 18, wherein the native resolution is one of 300 ppi, 600 ppi, and 1200 ppi.

20. The single-chip linear image sensor according to claim 17, further comprising a combining circuit configured to produce a single signal representative of the light received at said two imaging elements from each of the first and third rows, said single signal being provided to at least one of said plurality of shift register elements in the third shift register.

21. The single-chip linear image sensor according to claim 17, wherein:
the shift register elements of the first and second shift registers receive information from exactly one imaging element; and
the shift register elements of the third shift register receive information from exactly four imaging elements.

22. The single-chip linear image sensor according to claim 17, wherein the at least two imaging elements from each of the first and third rows together form a rectangular superpixel.

23. The single-chip linear image sensor according to claim 17, wherein:
the first, second and third rows and the first, second and third shift registers are all parallel to one another; and
the third row is adjacent the third shift register, the first row is adjacent the third row, the first shift register is adjacent the first row, the second row is adjacent the first shift register and the second shift register is adjacent the second row.

* * * * *